United States Patent [19]
Narayanaswami

[11] Patent Number: 5,613,052
[45] Date of Patent: Mar. 18, 1997

[54] METHOD AND APPARATUS FOR CLIPPING AND DETERMINING COLOR FACTORS FOR POLYGONS

[75] Inventor: Chandrasekhar Narayanaswami, Austin, Tex.

[73] Assignee: International Business Machines Corporation, Armonk, N.Y.

[21] Appl. No.: 116,238

[22] Filed: Sep. 2, 1993

[51] Int. Cl.$^6$ .................................................. G06T 15/30
[52] U.S. Cl. ............................................................ 395/134
[58] Field of Search ..................................... 395/120, 121, 395/122, 126, 127, 130–134, 152, 155, 157, 161; 382/41

[56] References Cited

U.S. PATENT DOCUMENTS

| | | | |
|---|---|---|---|
| 3,816,726 | 6/1974 | Sutherland et al. | 235/152 |
| 4,866,637 | 9/1989 | Gonzalez-Lopez et al. | 395/126 |
| 4,888,712 | 12/1989 | Barkans et al. | 395/134 |
| 4,941,111 | 7/1990 | Sfarti | 395/157 |
| 4,945,500 | 7/1990 | Deering | 395/122 |
| 4,958,305 | 9/1990 | Piazza | 395/127 |
| 5,051,737 | 9/1991 | Akeley et al. | 395/134 |
| 5,079,719 | 1/1992 | Maillot | 395/134 |
| 5,159,665 | 10/1992 | Priem et al. | 395/134 |
| 5,357,599 | 10/1994 | Luken | 395/123 X |

FOREIGN PATENT DOCUMENTS

| | | |
|---|---|---|
| 0163852A2 | 11/1985 | European Pat. Off. . |
| 2232564A | 11/1989 | European Pat. Off. . |

OTHER PUBLICATIONS

Foley et al. (1990) pp. 110–125, 922–945, 563–603.
*ACM Transactions on Graphics*, vol. 11, No. 3, Jul. 1992, "A New, Fast Method for 2D Polygon Clipping: Analysis and Software Implementation", P. Maillot, pp. 276–290.
*Computer Graphics, Principles and Practice*, Second Edition, Van Dam et al, pp. 110–131, 258–281, 855–1010.
IBM Technical Dislosure Bulletin, vol. 27 No. 1B Jun. 1984.
Line Clipping In Interactive Computer Graphics, I. F. Brackenbury, pp. 549–552.

*Primary Examiner*—Almis R. Jankus
*Attorney, Agent, or Firm*—Paul S. Drake; Volel Emile

[57] ABSTRACT

A method for clipping a graphical polygon to a clip region, the polygon being defined by multiple vertices with connecting edges, including the steps of computing which vertices of a polygon to be displayed may be discarded and computing at least one color factor only for vertices not discarded, computing boundary vertices on any edges intersect a clip region boundary and computing at least one color factor therefor, and displaying the vertices according to the computed color factors. In addition, an apparatus for clipping a graphical polygon to a clip region, the polygon being defined by multiple vertices with connecting edges, including apparatus for computing which vertices of a polygon to be displayed may be discarded and for computing at least one color factor only for vertices not discarded, apparatus for computing boundary vertices on any edges that intersect a clip region boundary and for computing at least one color factor therefor, and apparatus for displaying said vertices according to the computed color factors.

12 Claims, 13 Drawing Sheets

|  |  |  |
|---|---|---|
| 1001 Corner | 0001 Middle | 0101 Corner |
| 1000 Middle | 0000 | 0100 Middle |
| Corner 1010 | Middle 0010 | Corner 0110 |

+y
+x (a)

(b)

(c)

(d)

METHOD AND APPARATUS FOR CLIPPING AND DETERMINING COLOR FACTORS FOR POLYGONS

DESCRIPTION

1. Technical Field

The present invention relates generally to computer graphics systems and more particularly to a method and apparatus for more efficiently clipping polygons.

2. Background

In computer graphics systems, it is desired to represent two and three dimensional graphical picture on a two dimensional display. Typically, such a picture is a construct or image that may be stored in memory as a set of polygons. To generate the picture on the display, the polygons are then rendered using processes that are typically computationally intensive. However, a portion of the picture to be represented may fall outside the field of vision provided by a window on the display or by the display itself. In such cases, it may be desirable to clip the picture and the polygons comprising the picture as the picture is being generated, thereby reducing computational requirements and increasing rendering speed.

Polygon clipping is the process of removing that portion of a polygon that lies outside a region called the clip region. A polygon is typically specified as a set of vertices $P(0)$, $P(1) \ldots$, $P(n-2)$, $P(n-1)$, where n is the number of vertices in the polygon. The vertices of the polygon are specified such that the interior of the polygon lies to the left of the edges formed by consecutive vertices. Each vertex $P(i)$ is specified by its location $V(i)$ in a suitable coordinate space and a function, referred to herein as a color factor, $f(V(i))$. A color factor is a function evaluated at each vertex that may be displayed later as a color (including a grayscale) variation (such as a light intensity, a thermal characteristic, a humidity factor, etc.). The color factor may be converted to a color and is useful in modelling (such as simple lighting modelling or more complex weather modelling). The function or color factor, $f(V(i))$, is generally not evaluated at the start of the clipping technique and is typically evaluated only when there is a need due to the computational resources needed for evaluating the function.

Function or color factor interpolation is the process of computing the function or color factor value at a newly created vertex $P(k)$ at location $V(k)$. Function or color factor interpolation is generally performed when clipping at the intersection of the polygon and the boundary of the clip region. Typically, function or color factor interpolation is possible for evaluating $f(V(k))$ when $V(i)$, $f(V(i))$, $V(j)$, $f(V(j))$, and $V(k)$ are known.

In the traditional graphics pipeline, lighting (an example of function interpolation) for all polygon vertices is performed prior to clipping. As a result, lighting may be performed even when the polygon is not in the clip region, thereby wasting computational resources.

DISCLOSURE OF THE INVENTION

The present invention includes a method for clipping a graphical polygon to a clip region, the polygon being defined by multiple vertices with connecting edges, including the steps of computing which vertices of a polygon to be displayed may be discarded and computing at least one color factor only for vertices not discarded, computing boundary vertices on any edges that intersect a clip region boundary and computing at least one color factor therefor, and displaying the vertices according to the computed color factors. In addition, the present invention includes an apparatus for clipping a graphical polygon to a clip region, the polygon being defined by multiple vertices with connecting edges, including apparatus for computing which vertices of a polygon to be displayed may be discarded and for computing at least one color factor only for vertices not discarded, apparatus for computing boundary vertices on any edges that intersect a clip region boundary and for computing at least one color factor therefor, and apparatus for displaying said vertices according to the computed color factors.

A further understanding of the nature and advantages of the present invention may be realized by reference to the remaining portions of the specification and the drawings.

BEST MODE FOR CARRYING OUT THE INVENTION

This disclosure describes an improved clipping technique. In the preferred embodiment, the clipping technique does not necessarily compute intersections for trivially accepted or rejected cases as described below. For the cases not trivially rejected or accepted, the technique presented here does not necessarily compute functions or color factors for all vertices.

Figure 1:
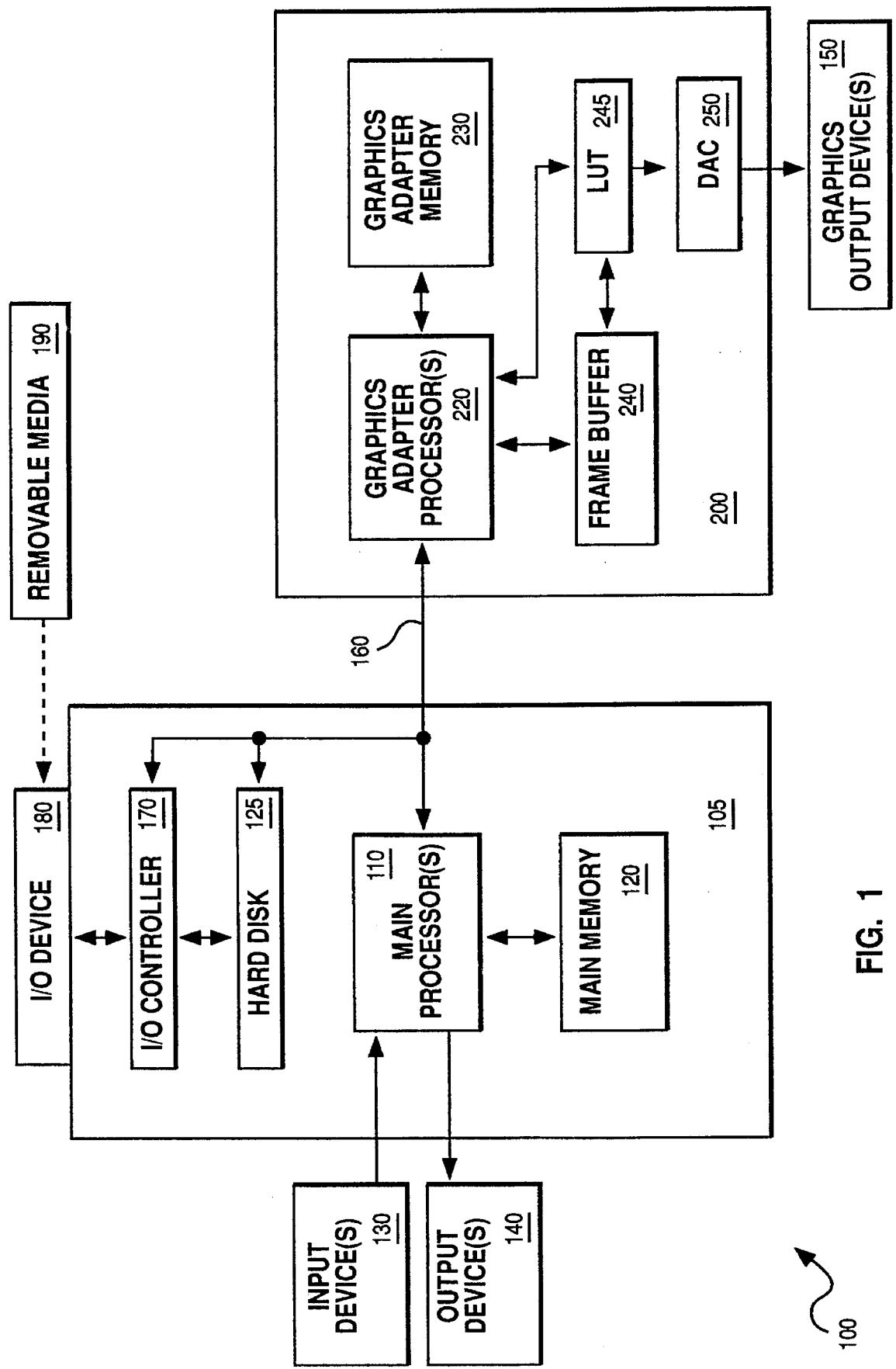
FIG. 1 is a diagram of a typical digital computer utilized by a preferred embodiment of the invention.

FIG. 1 is a block diagram of a typical digital computer 100 utilized by a preferred embodiment of the invention. The computer includes main processor(s) 110 coupled to memory 120 and a hard disk 125 in computer box 105 with input device(s) 130 and output device(s) 140 attached. Main processor(s) 110 may include a single processor or multiple processors. Input device(s) 130 may include a keyboard, mouse, tablet or other types of input devices. Output device(s) 100 may include a text monitor, plotter or other types of output devices. Computer readable removable media 190, such as a magnetic diskette or a compact disc, may be inserted into an input/output device 180, such as a disk drive or a CD-ROM (compact disc—read only memory) drive. Data is read from or written to the removable media by the I/O device under the control of the I/O device controller 170. The I/0 device controller communicates with the main processor through across bus 160. Main memory 120, hard disk 125 and removable media 190 are all referred to as memory for storing data for processing by main processor(s) 110.

The main processor may also be coupled to graphics output device(s) 150 such as a graphics display through a graphics adapter 200. Graphics adapter 200 receives instructions regarding graphics from main processor(s) 110 on bus 160. The graphics adapter then executes those instructions with graphics adapter processor(s) 220 coupled to a graphics adapter memory 230. The graphics processors in the graphics adapter then execute those instructions and updates frame buffer(s) 240 based on those instructions. Graphic processors 220 may also include specialized rendering hardware for rendering specific types of primitives. Frame buffer(s) 240 includes data for every pixel to be displayed on the graphics output device. A RAMDAC (random access memory digital-to-analog converter) 250 converts the digital data stored in the frame buffers into RGB signals to be provided to the graphics display 150 thereby rendering the desired graphics output from the main processor.

Figure 2:
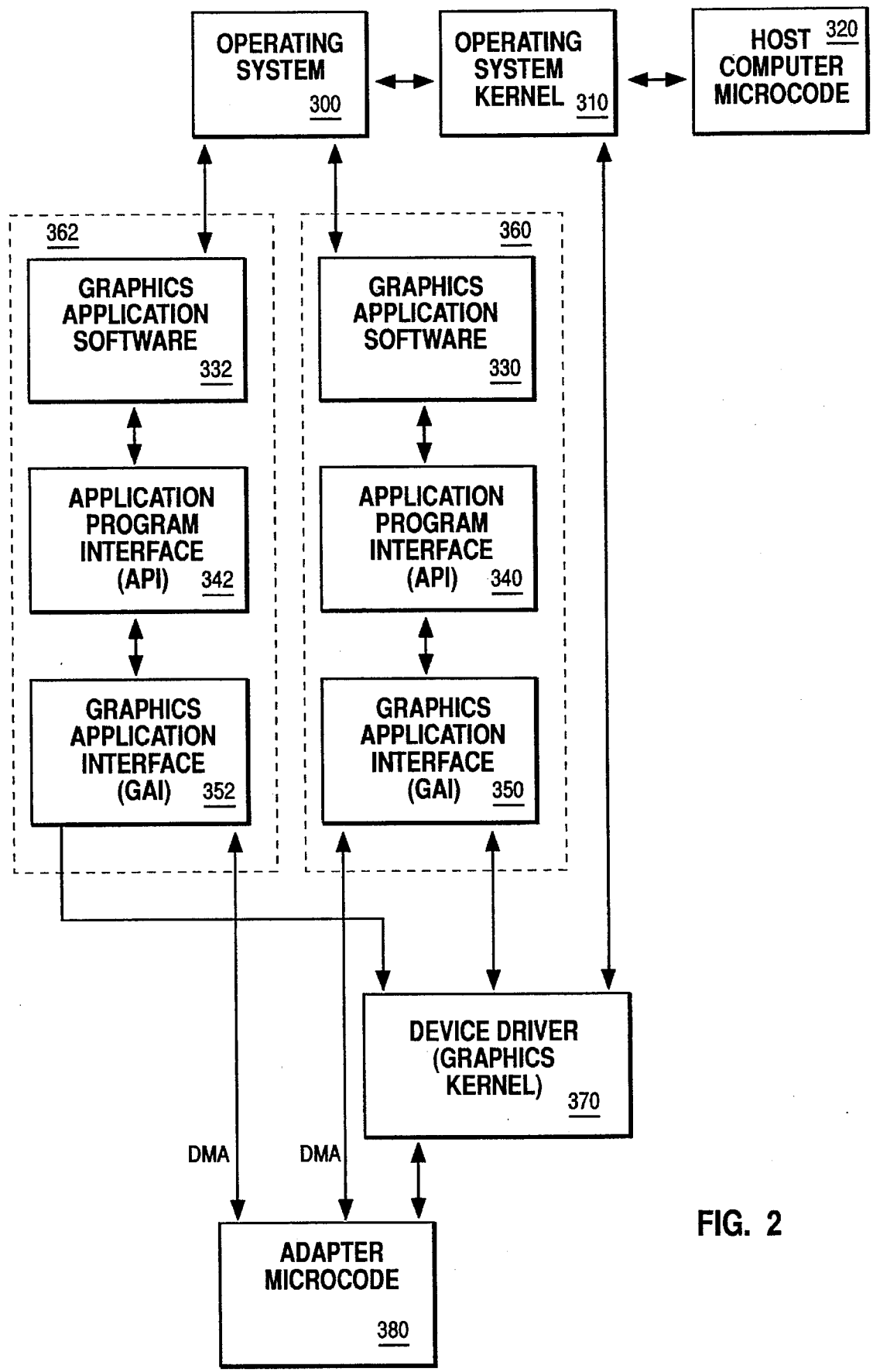
FIG. 2 is a block diagram illustrating the layers of code typically utilized by the host computer and graphics adapter to perform graphics functions.

FIG. 2 is a block diagram illustrating the layers of code typically utilized by the host computer and graphics adapter to perform graphics functions. An operating system 300 such as UNIX provides the primary control of the host computer. Coupled to the operating system is an operating system kernel 310 which provides the hardware intensive tasks for the operating system. The operating system kernel communicates directly with the host computer microcode 320. The host computer microcode is the primary instruction set executed by the host computer processor. Coupled to the operating system 300 are graphics applications 330 and 332. This graphics application software can include software packages such as Silicon Graphic's GL, IBM's graPHIGS, MIT's PEX, etc. This software provides the primary functions of two dimensional or three dimensional graphics. Graphics applications 330 and 332 are coupled to graphics application API (application program interface) 340 and 342, respectively. The API provides many of the computationally intensive tasks for the graphics application and provides an interface between the application software and software closer to the graphics hardware such as a device driver for the graphics adapter. For example, API 340 and 342 may communicate with a GAI (graphics application interface) 350 and 352, respectively. The GAI provides an interface between the application API and a graphics adapter device driver 370. In some graphics systems, the API also performs the function of the GAI.

The graphics application, API, and GAI are considered by the operating system and the device driver to be a single process. That is, graphics applications 330 and 332, API 340 and 342, and GAI 350 and 352 are considered by operating system 300 and device driver 370 to be processes 360 and 362, respectively. The processes are identified by the operating system and the device driver by a process identifier (PID) that is assigned to the process by the operating system kernel. Processes 360 and 362 may use the same code that is being executed twice simultaneously, such as two executions of a program in two separate windows. The PID is used to distinguish the separate executions of the same code.

The device driver is a graphics kernel which is an extension of the operating system kernel 310. The graphics kernel communicates directly with microcode of the graphics adapter 380. In many graphics systems, the GAI, or the API if no GAI layer is used, may request direct access from the GAI or API to the adapter microcode by sending an initial request instruction to the device driver. In addition, many graphics systems also allow the adapter microcode to request direct access from the adapter microcode to the GAI or API if no GAI is used by sending an initial request instruction to the device driver. Both processes will hereinafter be referred to as direct memory access (DMA). DMA is typically used when transferring large blocks of data. DMA provides for a quicker transmission of data between the host computer and the adapter by eliminating the need to go through the display driver other than the initiate request for the device driver to set up the DMA. In some cases, the adapter microcode utilizes context switching which allows the adapter microcode to replace the current attributes being utilized by the adapter microcode. Context switching is used when the adapter microcode is to receive an instruction from a graphics application that utilizes different attributes than the adapted microcode is currently using. The context switch is typically initiated by the device driver which recognizes the attribute changes.

Blocks 300–340 are software code layers that are typically independent of the type of graphics adapter being utilized. Blocks 350–380 are software code layers that are typically dependent upon the type of graphics adapter being utilized. For example, if a different graphics adapter were to be used by the graphics application software, then a new GAI, graphics kernel and adapter microcode would be needed. In addition, blocks 300–370 typically reside on and are executed by the host computer. However, the adapter microcode 380 typically resides on and is executed by the graphics adapter. However, in some cases, the adapter microcode is loaded into the graphics adapter by the host computer during initialization of the graphics adapter.

In typical graphics systems, the user instructs the graphics application to construct an image from a two or three dimensional model. The user first selects the location and type of light sources. The user then instructs the application software to build the desired model from a set of predefined or user defined objects. Each object may include one or more coplanar drawing primitives describing the object. For example, a set of drawing primitives such as many triangles may be used to define the surface of an object. The user then provides a perspective in a window to view the model, thereby defining the desired image. The application software then starts the rendering of the image from the model by sending the drawing primitives describing the objects to the adapter microcode through the API, the GAI, and then the device driver unless DMA is used. The adapter microcode then renders the image on the graphics display by clipping (i.e. not using) those drawing primitives not visible in the window and the adapter microcode breaks each remaining drawing primitive into visible pixels from the perspective given by the user. The pixels are then loaded into the frame buffer, often with the use of a depth buffer in the case of a three dimensional model. This step is very computationally intensive due to the number of drawing primitives, variables, and pixels involved. The resulting image stored in the frame buffer and displayed on the graphics display typically does not carry the original information such as which drawing primitive or object the pixel was derived from. As a result, the image may need to be rerendered in part or in whole if the window, the user perspective, the model, the lighting, etc. are modified.

In the preferred embodiment, the clipping technique could be utilized in many locations such as the adapter microcode which is close to the adapter frame buffer. This approach would also be relatively quick and fairly easy to implement. In addition, the clipping technique could be applied in the graphics application software wherein the rendered image is also stored in system memory either prior to the image being rendered or subsequently by the graphics adapter passing the data back up to the graphics application software. This approach would be much slower but would allow for utilization of this technique on preexisting graphics adapters. The clipping technique coupled also be implemented in hardware in the graphics adapter processor. This approach is extremely quick but may necessitate specialized hardware. This would allow for rapid clipping of primitives to be displayed by the graphics adapter. As would be obvious to one of ordinary skill in the art, the present technique would be applied in many other locations within the host computer or graphics adapter.

For simplicity, a 2D (two dimensional) version of the clipping technique is first described. The basic concepts from the 2D technique can also be applied to 3D (three dimensional) version as indicated herein. The canonical clip region is preferably a normalized clip region and is defined by the region $\{-1.0<=x<=1.0\}$ and $\{-1.0<=y<=1.0\}$ (and $\{-1.0<=z<=1.0\}$ if 3D). This region is widely used because clipping hardware can be optimized when designing for a fixed size clip region. If clipping to some other clip region is desired, the clip region and the polygon may be transformed to the canonical clipping space and the clipped result is then transformed back to obtain the desired result. However, non-canonical and rectangular clip regions pose no conceptual problem to the technique described herein.

Figure 3:
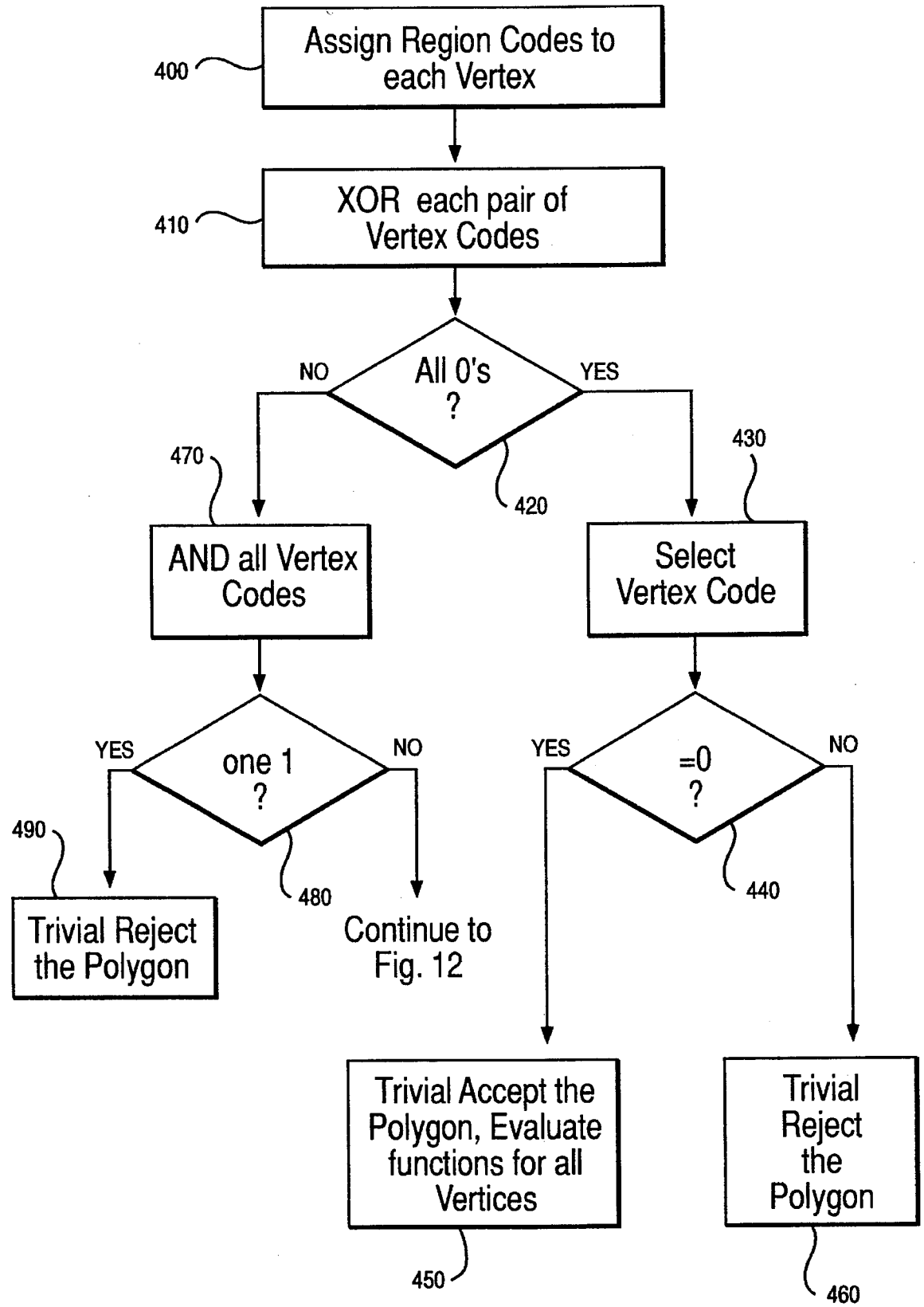
FIG. 3 is a flowchart illustrating determining trivial accept and trivial reject cases of polygons.

FIG. 3 is a flowchart illustrating determining trivial accept and trivial reject cases for polygons. That is, all polygons are initially tested in the preferred embodiment to determine whether they can be trivially accepted or trivially rejected to reduce utilization of computational resources. If a polygon is not trivially accepted or trivially rejected, then the polygon would be subjected to the more computationally intensive technique of the present invention. However, it is not required by the present invention to trivially reject or trivially accept any polygons.

Figures 4, 5:
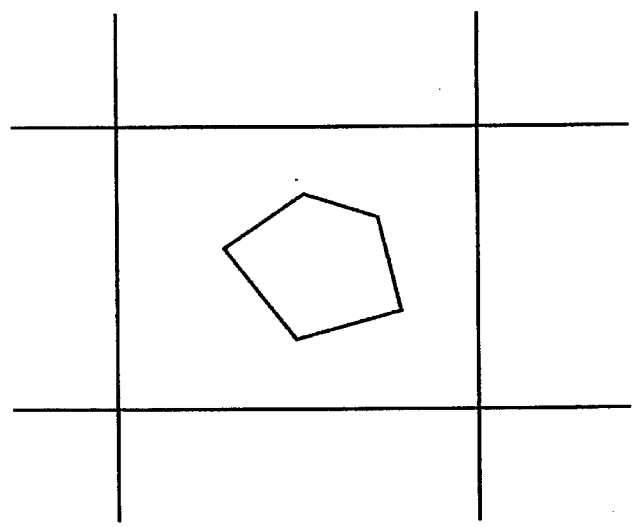
FIG. 4 illustrates the nine non-overlapping regional boundaries of the clip region in 2D space.
FIG. 5 illustrates a trivially accepted polygon that is wholly within the clip region.

In a first step 400, each of the polygon vertices is assigned a four bit region code. The boundaries of the clip region divide all of the 2D space into nine non-overlapping regions as shown in FIG. 4. Each of these regions is given a unique 4-bit region code (C3 C2 C1 C0) as shown. The four regions whose codes contain two ones will be referred to as corner regions. The four regions with a single one in their code will be referred to as middle regions and the lone region with no ones will be referred to as the center region. The points of intersection of the boundaries of the clip region will be referred to as corner vertices. The code for a polygon vertex is the same as the code for the region where it is located. In the preferred embodiment, the region code for a vertex can be determined rapidly by the following simple test using the vertex x and y coordinates:

C3=1 if x<−1.0, else C3=0;

C2=1 if x>1.0, else C2=0;

C1=1 if y<−1.0, else C1=0; and

C0=1 if y>1.0, else C0=0.

Several possible cases arise while clipping a polygon to a 2D canonical clip region. They are trivial accept, trivial reject, and residual cases. These classifications are made for simplicity of exposition and to explain the present invention.

The present invention handles all cases by switching from one case to another as needed. Each of these cases is now discussed in greater detail.

Figure 6:
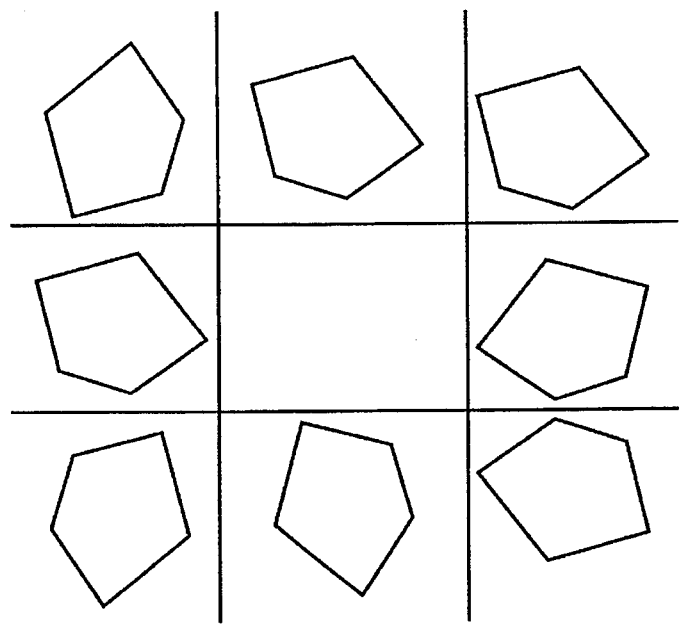
FIG. 6 illustrates trivially rejected polygons that are wholly within a middle or corner region outside the clip region.

As shown in FIG. 5, the complete polygon may be trivially accepted if the whole polygon is within the clip region. This condition can be detected by determining whether the region codes are equal to zero for all the vertices in the polygon. FIG. 6 shows polygons which lie wholly within a middle or corner region outside the clip region. Each of these polygons may be trivially rejected such that no intersections need be computed and no function or color factor evaluations are needed. This condition can be detected by determining that all the vertices share the same region code that is not equal to zero.

In step 410, the region codes for every possible pair of contiguous vertices in the polygon are XOR'd together to determine if any edge crosses a regional boundary. In step 420, it is determined whether the result is equal to zero (indicating no edge crosses a regional boundary). If the result of step 420 is yes, then in step 430 the region code for any vertex of the polygon is selected or the region code for any number of vertices are OR'd together and selected. In step 440, it is determined whether the result of the selection operation is equal to zero (indicating that the polygon is wholly within the clip region) or not (indicating that the polygon is wholly within a region other than the clip region), If the result of step 440 is yes, then in step 450 the polygon is trivially accepted as being wholly within the clip window. As a result of a trivial accept, no intersections need to be computed because all of the vertices and edges lie completely within the clip region. Therefore, the functions or color factors of all the vertices, including light calculations if desired, are evaluated prior to continuing to the next polygon. If the result of step 440 is no, than in step 460 the polygon is trivially rejected as not being within the clip region at all. As a result, no intersections need to be calculated and no evaluation of functions or color factors (such as lighting, thermal characteristics, or the like) are needed at the vertices. Processing then continued to the next polygon to be clipped.

Figure 7:
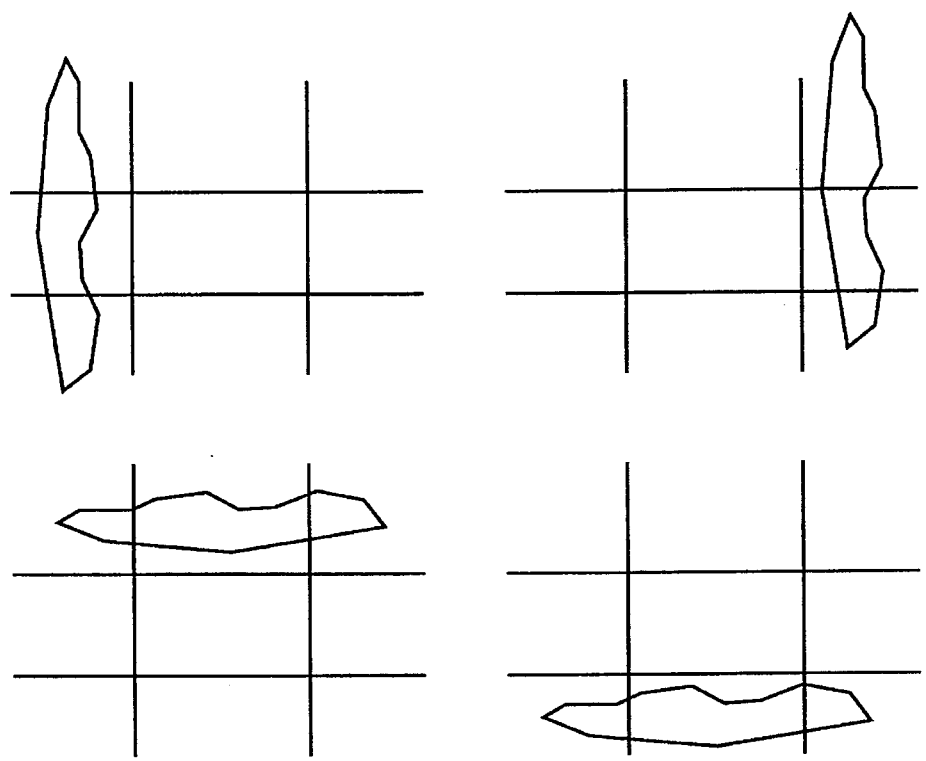
FIG. 7 illustrates some additional polygons that can be trivially rejected.

FIG. 7 shows some additional cases that can be trivially rejected. These polygons lie to one side of a clip boundary and outside the clip region. If the result of step 420 is no, then in step 470 the region codes for all the vertices are AND'd. In step 480, it is determined whether there is a single one in the AND'd region code. If yes, then the polygon can be trivially rejected in step 490 as not being within the clip region at all. As a result, no intersections need to be calculated and no evaluation of functions such as lighting are needed at the vertices. Processing would then continue to the next polygon to be clipped. However, if in step 480 it is determined that there is not a single one in the AND'd region code, then processing continues to FIGS. 12A–D to handle these residual cases.

When the number of vertices is much greater than four it may be worthwhile to clip the bounding box for the polygon first. In many instances the bounding box for the polygon is available as a result of prior processing through the graphics pipeline. If the bounding box for the polygon is trivially accepted, so will be the polygon. Therefore, the complete clipping process can be disabled in this case. If the bounding box for the polygon is trivially rejected, so will be the polygon. Therefore, the complete polygon can be discarded in this case. Let B(0), B(1), B(2), B(3) be a rectangular bounding box. This box contains a corner vertex of the clip region if there are two or more ones in [region code B(i) XOR region code B(i+1)] OR [region code B(i+1) XOR region code B(i+2)] for any i where i=(0, 1, 2 or 3) with modulo 4 addition. If the bounding for the polygon does not include any corner vertex of the clipping region no part of the bounding box can be inside the clip region. Therefore, the complete polygon can be discarded in this case.

Figure 8:
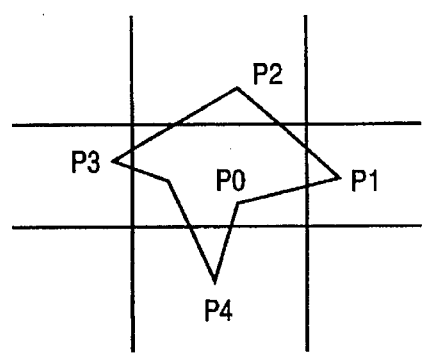
FIG. 8 illustrates some residual cases of polygons that are not trivially rejected or trivially accepted according to a preferred embodiment of the invention.
Figure 8:
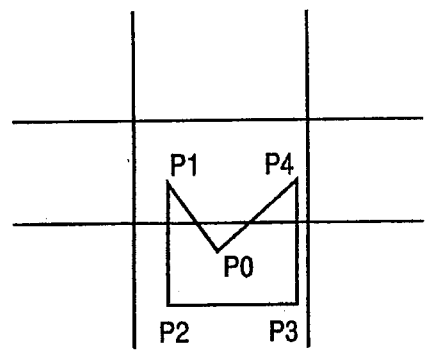
Figure 8:
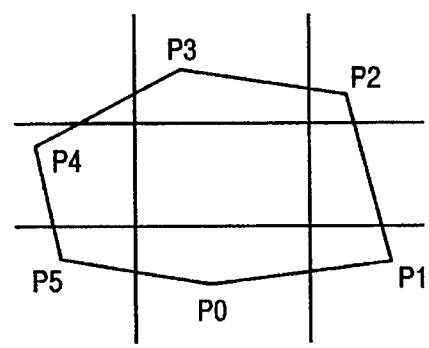
Figure 8:
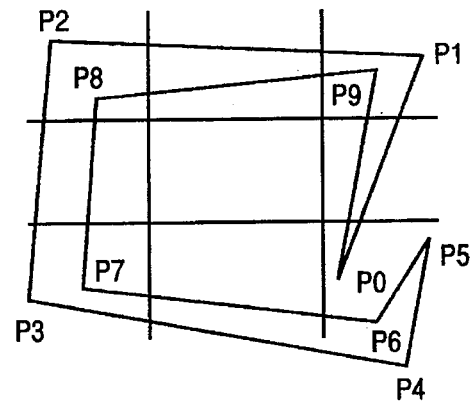

FIG. 8 illustrates some residual cases of polygons that are not trivially rejected or trivially accepted according to a preferred embodiment of the invention. Case (a) represents a simple case where part of the polygon is inside the clip region and part of it is outside. The clipped portion of the polygon is a singly-connected polygon. Case (b) is similar to case (a) but the clipped portion of the polygon is multiply connected. Case (c) illustrates there none of the vertices of the polygon lie in the clip region yet the polygon covers the clip region. Case (d) illustrates where none of the vertices of the polygon lie in the clip region and no part of the polygon is visible in the clip region.

Figure 9:
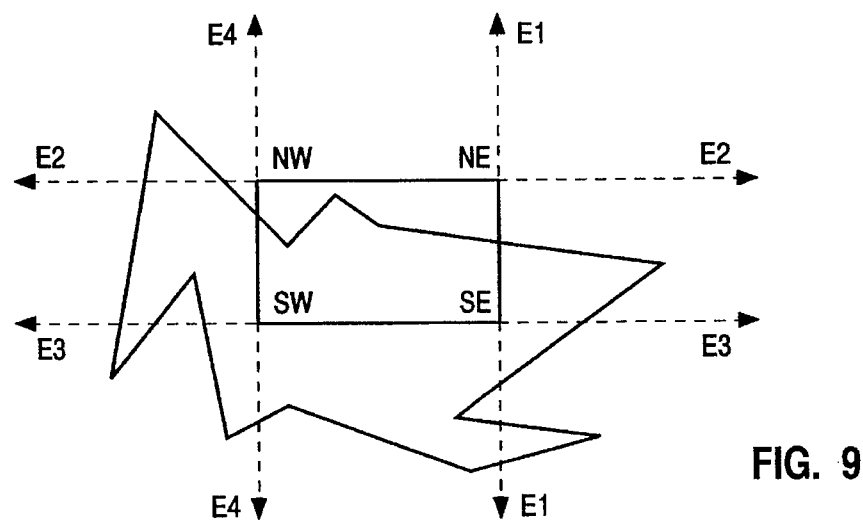
FIG. 9 illustrates a polygon encompassing some of the corner vertices of a clipping region.

The above cases are difficult to process because corner vertices may need to be added. A corner vertex has to be added if it lies inside the polygon. This can be determined by checking whether a vertical or horizontal ray from the corner vertex to infinity intersects the polygon an odd number of times. FIG. 9 illustrates a polygon encompassing some of the corner vertices of a clipping region. Vertical and horizontal boundaries E1–E4 are shown extending from the clipping region through the polygon. Based on the intersections of the rays with the polygon, corners SE and SW should be included in the output polygon and corners NE and NW should not. This determination can be also accomplished by use of the region codes for the vertices of the input polygon. However, this detection alone may not be sufficient since the exact position of the corner vertex in the output polygon cannot easily be determined by this approach. The crucial attribute is that the vertex needs to be inserted in the output polygon when it is determined that the edges of the polygon have crossed both of the boundaries that intersect to form the corner an odd number of times. For example, in case (c) of FIG. 8, the bottom right corner is added to the output only after traversing P(0), P(1), and P(2). Moreover, corner vertices added earlier on in the technique may need to be removed later. For example, in case (d) of FIG. 8, after traversing P(0), P(1), and P(2) the top right corner is added to the output, and after traversing P(8), P(9), and P(0), it is removed.

A combinatorial approach is adopted to the problem being solved. Consider any two vertices of the polygon. Each of the vertices may be in any one of the nine regions thus giving rise to 81 different types of edges (i.e. 81 combinations of region codes for the two vertices defining an edge). Of these 81 different types of edges, one of them is trivially accepted and eight of them are trivially rejected. The above are cases where the edge is wholly within a single region and does not intersect a boundary edge of the clipping region. In these cases, any corner detection logic is disabled in the preferred embodiment.

Figure 10A:
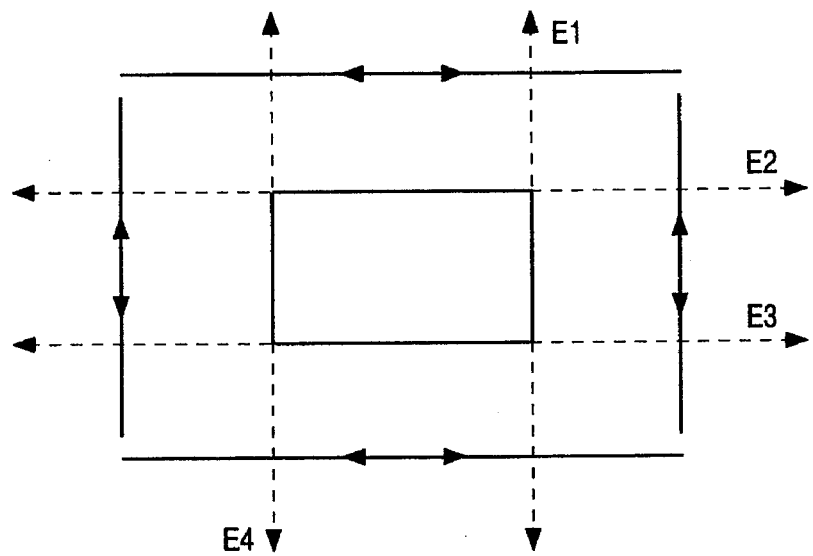
FIGS. 10A–B illustrate 28 non-trivial cases where edges do not intersect the clipping region.

A total of 72 cases where the edges intersect the clip boundaries still remain. For all these cases corner detection logic has to be enabled. Eight of these cases are isolated as shown in FIG. 10A so that significant speedup can be obtained for electrical CAD applications where horizontal and vertical edges are very common. Note that not all edges that are isolated in the above case are exactly horizontal or vertical.

The remaining 64 cases are classified according to the number and type of intersections the edge makes with the clipping region boundaries E1–E4 (see FIG. 10B) of the clipping region. This is done to aid the corner vertex detection process. Except when one of the vertices lies inside the clip region, the length of the edge is irrelevant in this classification. An intersection is classified as i (out→in) with respect to a boundary if the edge is going into clip-region side of that boundary, and o (in→out) with respect to a boundary if the edge is going into the infinity side of that boundary. If there is more than one i (out→in) intersection, the one that is farthest from the starting vertex of the edge is retained. If there is more than one o (in→out) intersection, the one that is nearest to the starting vertex of the edge is retained.

Figure 11A:
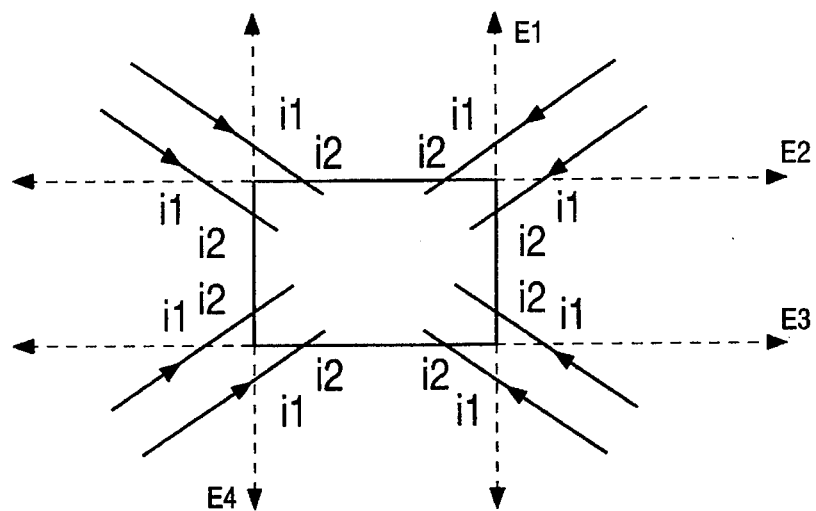
FIGS. 11A–C illustrate 48 cases where the edges cross the clipping boundaries.
Figure 11B:
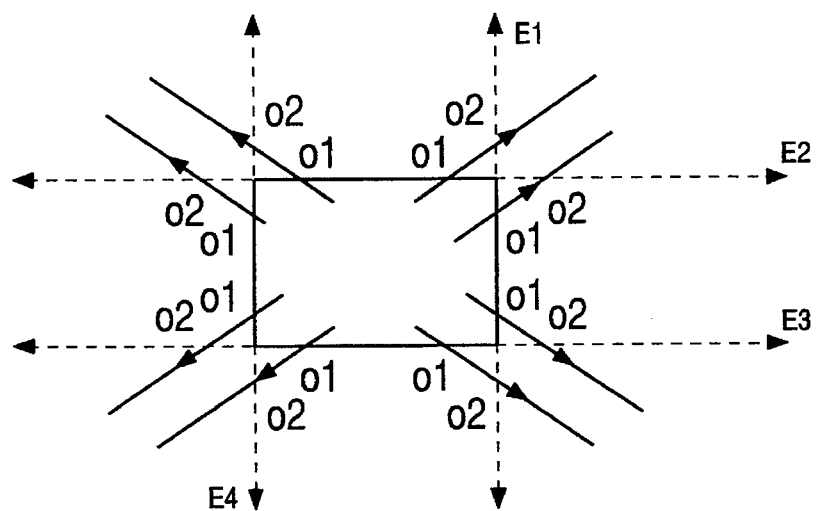
Figure 11C:
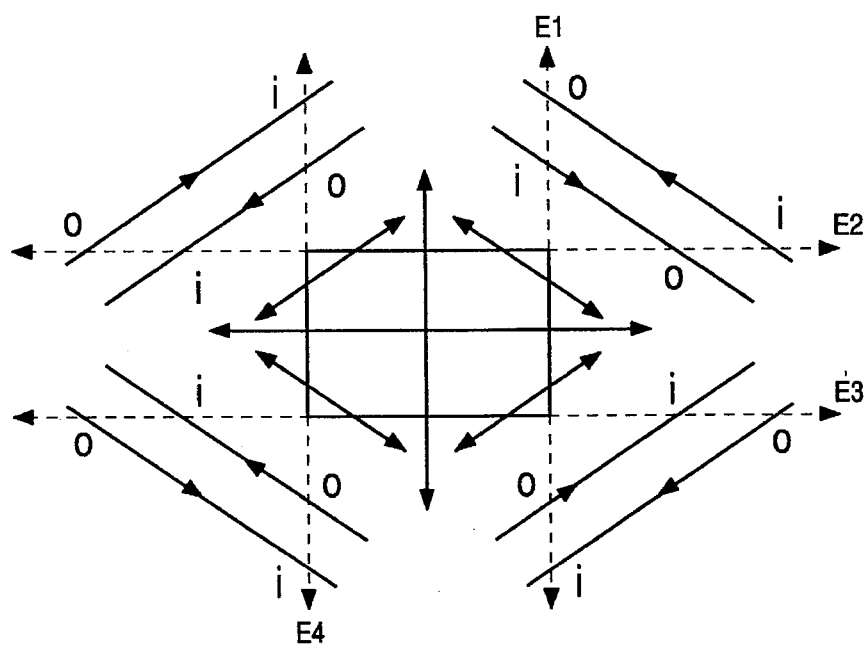

Of the 64 cases, 16 cases are covered by edges shown in FIG. 11A, 8 cases by edges shown in each of FIG. 11B, and 32 cases by the edges shown in FIG. 11C (of which 20 cases are shown with the other 12 cases being translations of some of the cases shown).

Figure 10B:
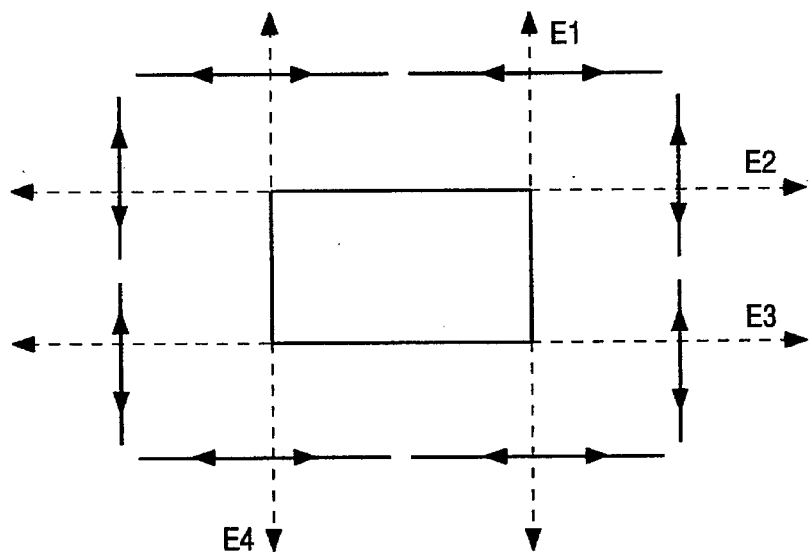

In the cases shown in FIG. 10B there is only a single intersection with a boundary for each case. For the cases in FIGS. 11A and 11B there are exactly two intersections for each case, both of which are either i (out→in) or o (in→out) intersections. For the cases in FIG. 11C there are two or more intersections, at least one of which is an i (out→in.) intersection and at least one of which in an o (in→out) intersection.

FIGS. 12A–E are flowcharts illustrating clipping vertices and evaluating vertex functions or color factors for a polygon using the cases described above. Preferably this technique is applied to polygons not already trivially accepted or rejected under FIG. 3 as described above. In a first step 500, a region code is assigned to a current vertex V of the polygon. In step 510, it is determined whether the vertex V is inside the clip region (i.e. whether the region code for the vertex is equal to 0000) or not. If the vertex V is inside the clip region, then in step 520 the vertex function or color factors for vertex V is evaluated. For example, lighting calculations for vertex V may be performed. Then, in step 530, it is determined whether the previous vertex P was inside the clip region (i.e whether the region code for the vertex is equal to 0000) or not. This test determines whether the last edge of the polygon crossed any of the clip boundaries. Given that this is the first vertex being processed, then the answer is no and processing continues to step 540. Step 530 may also determine in the affirmative if the last edge of the polygon was wholly within the clip region. However, if the previous vertex P was outside the clip region in step 530, then processing continues to FIG. 12B (this condition is caused by the last edge extending from outside the clip region to inside the clip region). In step 540, it is determined if vertex V is the last vertex of the polygon. If yes, then processing of the polygon continues to FIG. 12E and the process for the current polygon is ended. If no, then in step 550 the current vertex V is outputted (i.e. stored to memory or the like). In step 560, the current vertex V is stored as the previous vertex P and a new current vertex V is loaded for processing. Execution then returns to step 500.

If, in step 510, it was determined that vertex V is not inside the clip region (i.e. the vertex V region code is not equal to 0000), then processing continues to step 570. In step 570, it is determined whether the previous vertex P is in the same region as current vertex V. If yes, then the last edge resides wholly within a region other than the clip region and may be trivially rejected. In that case, processing continues to step 575. In step 575, it is determined whether vertex V is the last vertex. If yes, then processing continues to FIG. 12E, else processing continues to step 560 described above. If, in step 570, it is determined that the current vertex V and the previous vertex P are in different regions, then processing continues to step 580. In step 580, it is determined for future steps which of the clipping boundaries are crossed by the last edge. The clipping boundaries are the two vertical and two horizontal rays that extend to infinity in either direction and that are used to define the clip region as described in FIG. 9 above. Then, in step 590, it is determined whether the previous vertex was inside the clip region. If yes, then the last edge extends from inside the clip region to outside the clip region. Otherwise, then the last edge extends from outside the clip region to outside the clip region. Processing then continues to FIG. 12C and FIG. 12D respectively.

Figure 12A:
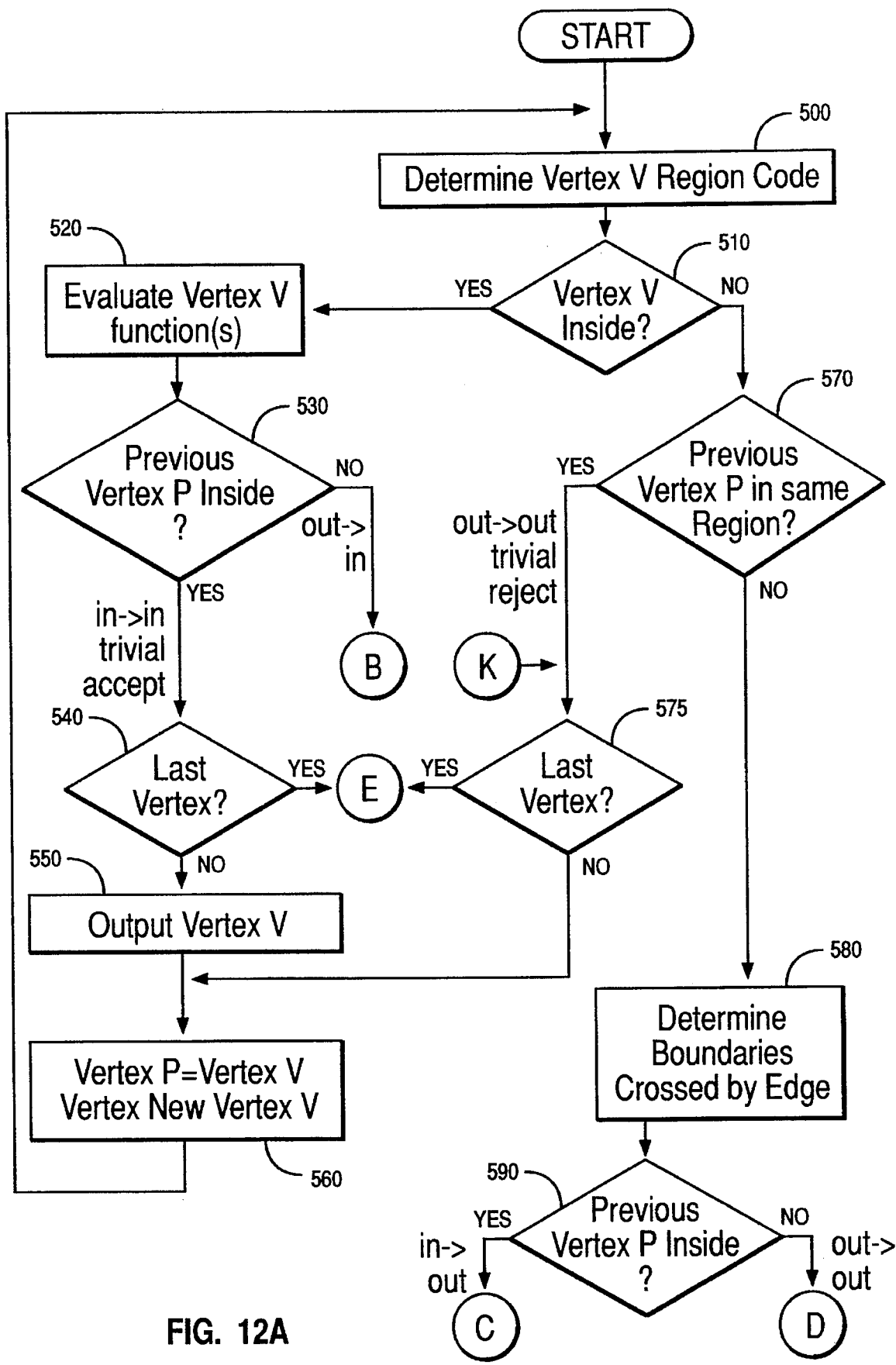
FIGS. 12A–E are flowcharts illustrating clipping vertices and evaluating vertex functions for a polygon.
Figure 12B:
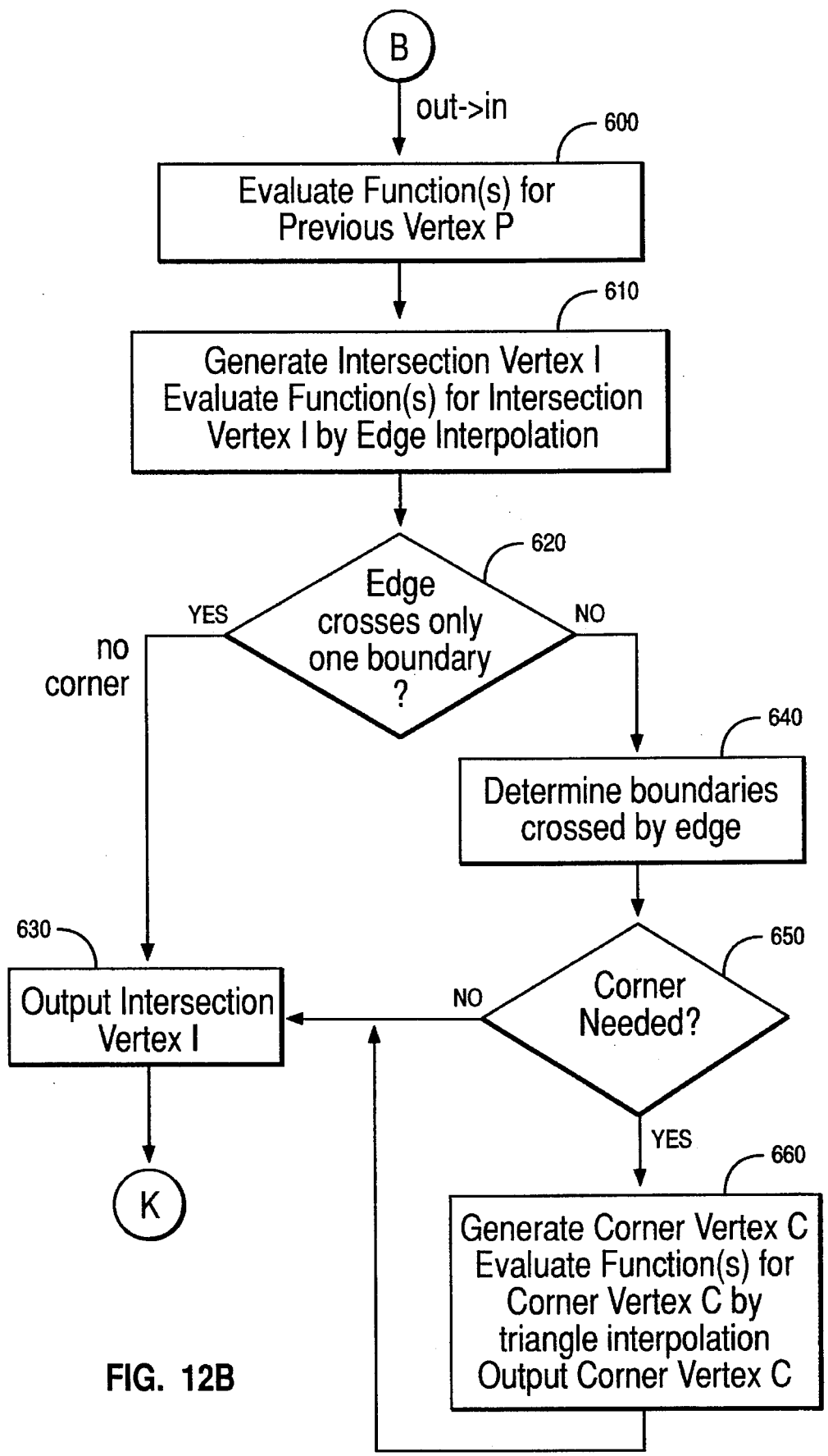

FIG. 12B is directed to handling an edge extending from a region outside the clip region to inside the clip region and is initiated in step 530 described above. Since the last edge extends into the clip region, an intersection vertex I at the intersection of the last edge and the clip region needs to be determined. In step 600, the function(s) (such as lighting) needs to be evaluated for the previous vertex P. In step 610, based on the location and functional results for the previous vertex P and the current vertex V, an intersection vertex I is generated, and function(s) for the vertex are evaluated by edge interpolation. In step 620, it is determined whether the edge crosses only one clip boundary. If yes, then no corner vertex needs to be generated. As a result, in step 630, the intersection vertex I calculated above is outputted and processing continues to step 575 described above. However, if in step 620 more than one boundary was crossed, processing continues to step 640. In step 640, it is determined which clip boundaries were crossed by the last edge. In step 650, it is determined from the clip boundaries crossed by the last edge whether a corner vertex C needs to be generated. In the preferred embodiment, a corner vertex is generated when the polygon crosses both a vertical clip boundary and a horizontal clip boundary. If a corner is not needed, then processing continues to step 630 described above. If a corner is needed, then in step 660, a corner vertex C is generated, the function(s) or color factors for the vertex are evaluated by triangle interpolation, and the vertex is outputted. Triangle interpolation for the corner vertex C by evaluating the function(s) for the current vertex V and the two previous vertices, which provides a triangle, and then interpolating to the corner vertex C from the triangle. Whenever a corner is generated, it may be replacing or erasing a previously generated corner at the same location. Processing then continues to step 630 described above.

Figure 12C:
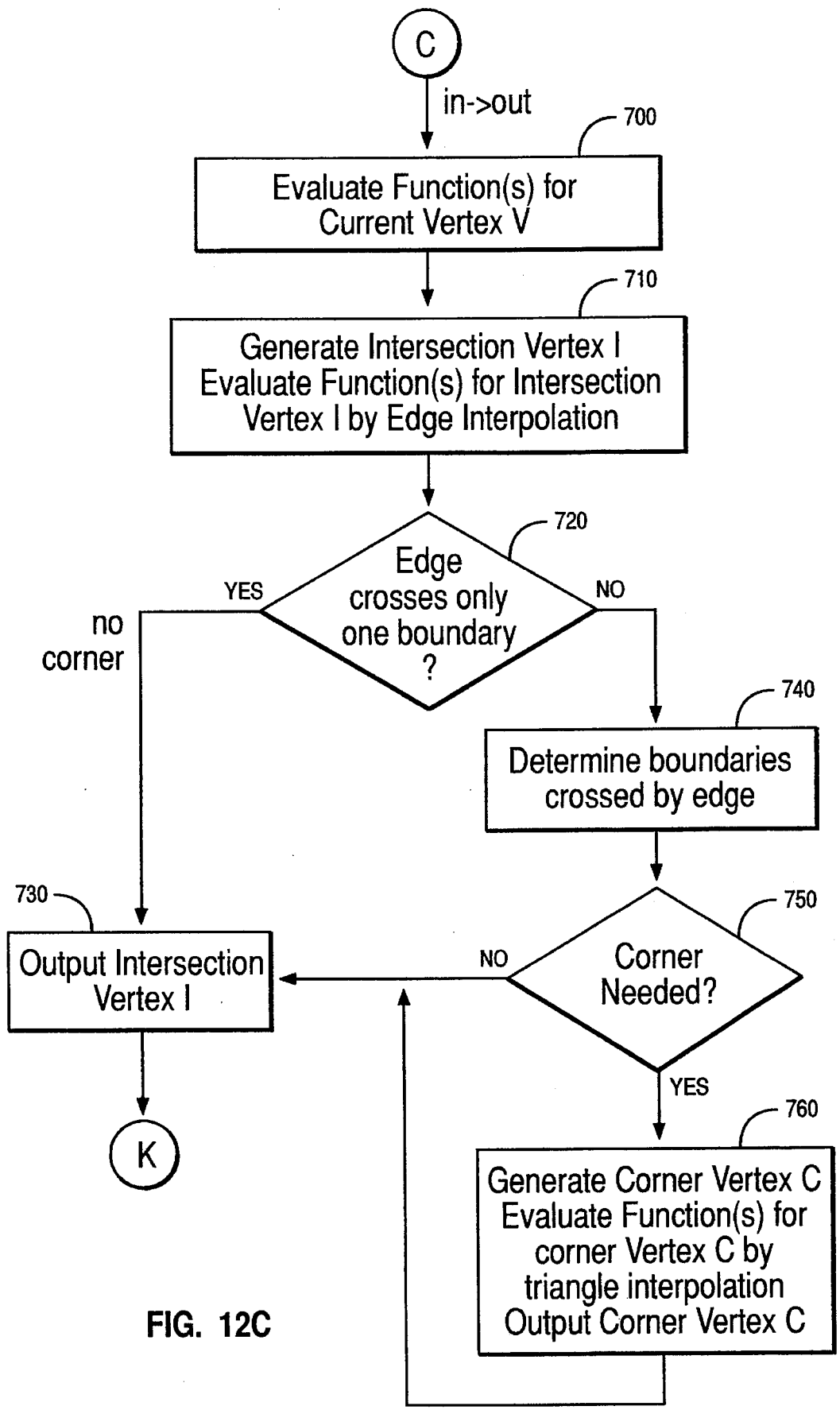

FIG. 12C is directed to handling an edge extending from inside the clip region to a region outside the clip region and is initiated in step 590 described above. Since the last edge extends out of the clip region, an intersection vertex I at the intersection of the last edge and the clip region needs to be determined. In step 700, the function(s) or color factors (such as lighting, thermal characteristics, humidity, etc.) needs to be evaluated for the current vertex V. In step 710, based on the location and functional results for the previous vertex P and the current vertex V, an intersection vertex I is generated, and function(s) for the vertex are evaluated by edge interpolation. In step 720, it is determined whether the edge crosses only one clip boundary. If yes, then no corner vertex needs to be generated. As a result, in step 730, the intersection vertex I calculated above is outputted and processing continues to step 575 described above. However, if in step 720 more than one boundary was crossed, processing continues to step 740. In step 740, it is determined which clip boundaries were crossed by the last edge. In step 750, it is determined from the clip boundaries crossed by the last edge whether a corner vertex C needs to be generated.

In the preferred embodiment, a corner vertex is generated when the polygon crosses both a vertical clip boundary and a horizontal clip boundary. If a corner is not needed, then processing continues to step 730 described above. If a corner is needed, then in step 760, a corner vertex C is generated, the function(s) for the vertex are evaluated by triangle interpolation, and the vertex is outputted. Triangle interpolation for the corner vertex C by evaluating the function(s) for the current vertex V and the two previous vertices, which provides a triangle, and then interpolating to the corner vertex C from the triangle. Whenever a corner is generated, it may be replacing or erasing a previously generated corner at the same location. Processing then continues to step 730 described above.

Figure 12D:
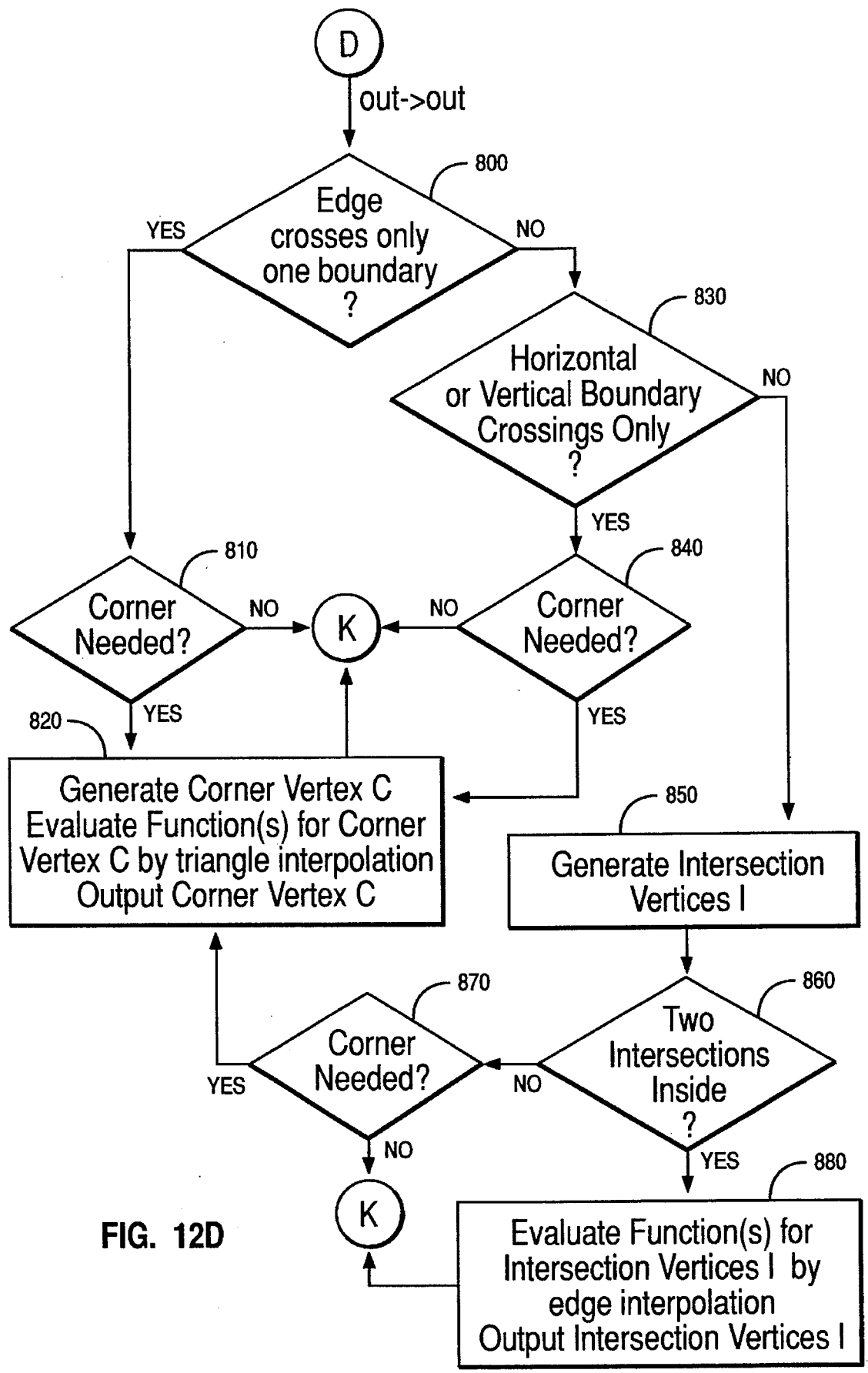
Figure 12E:
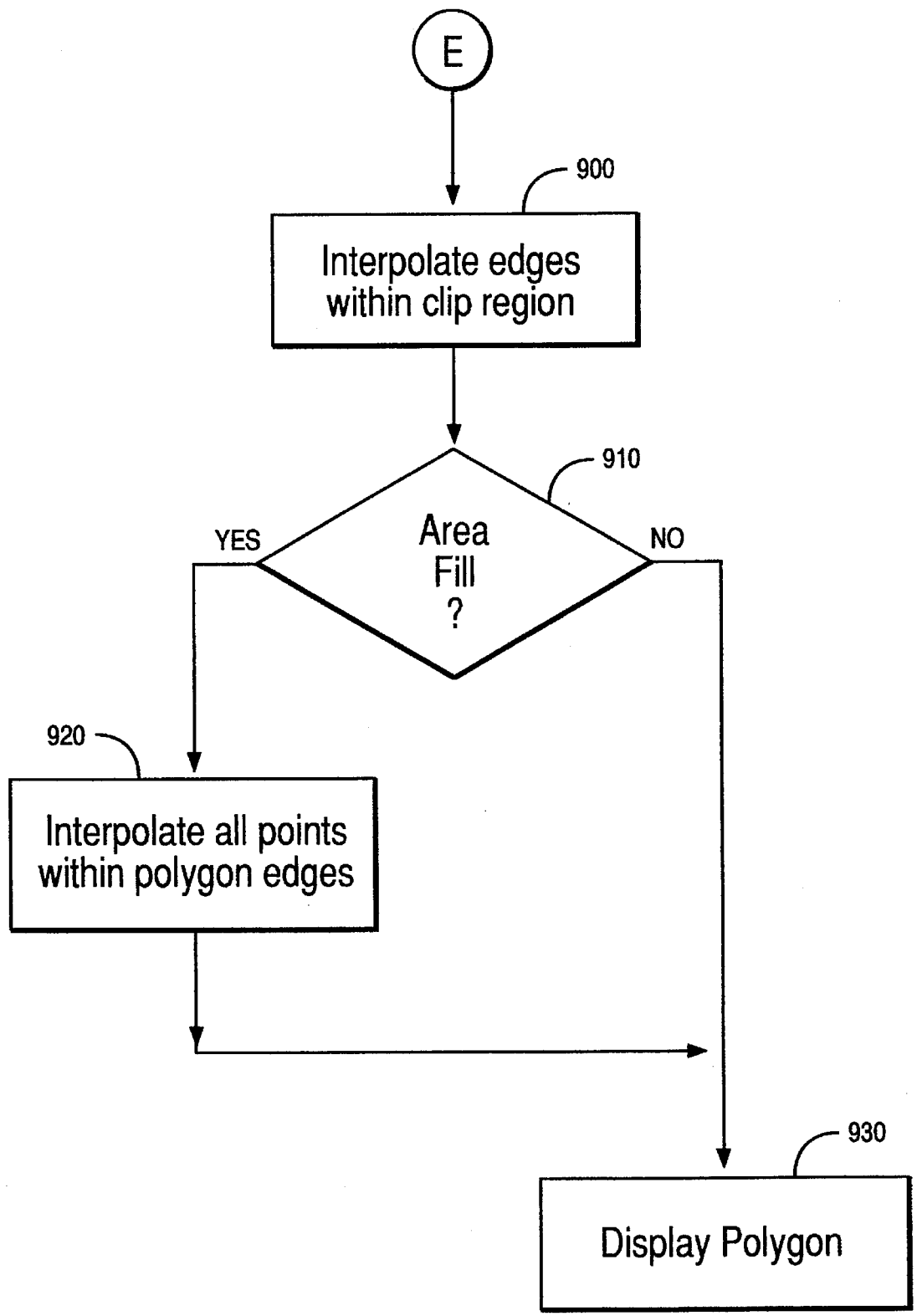

FIG. 12D is directed to handling an edge extending from one region outside the clip region to another region outside the clip region and is initiated in step 590 described above. In step 800, it is determined whether the edge crosses only one clip boundary. If yes, then in step 810, it is determined from the clip boundaries crossed by the last edge whether a corner vertex C needs to be generated. In the preferred embodiment, a corner vertex is generated when the polygon crosses both a vertical clip boundary and a horizontal clip boundary. If a corner is needed, then in step 820, a corner vertex C is generated, the function(s) for the vertex are evaluated by triangle interpolation, and the vertex is outputted. Triangle interpolation for the corner vertex C by evaluating the function(s) or color factors for the current vertex V and the two previous vertices, which provides a triangle, and then interpolating to the corner vertex C from the triangle. Whenever a corner is generated, it may be replacing or erasing a previously generated corner at the same location. Once a corner vertex is outputted in step 820 or if it is determined that a corner is not needed in step 810, processing then returns to step 575 described above. However, if in step 800 more than one boundary was crossed, processing continues to step 830. In step 830, it is determined whether the last edge crosses only horizontal or vertical boundaries only. If yes, then in step 840, it is determined whether a corner vertex C is needed. If a corner vertex C is needed, then processing continues to step 820 described above, else processing continues to step 575 described above. If it is determined in step 830 that the last edge crosses both a horizontal boundary and a vertical boundary, then processing continues to step 850 to handle the possibility that the last edge may cross through the clip region. In step 850, intersection vertices I are generated where the last edge crosses the horizontal and vertical boundaries. In step 860, it is determined whether the two intersection vertices are inside the clip region. If yes, then in step 880, the function(s) of the intersection vertices I evaluated (such as lighting) using edge interpolation, the intersection vertices I are outputted, and processing then continues to step 575 described above. If no, then it is determined in step 870 whether a corner vertex C is needed. If yes, then processing continues to step 820 described above, else processing continues to step 575 described above.

It should be evident that, in the preferred embodiment, intersections are computed in the following three cases. First, when the previous vertex is inside the clipping region and the current vertex is outside the clipping region. Second, when the previous vertex is outside the clipping region and the current vertex is inside the clipping region. Third, when both the previous and current vertices are outside the clipping region and there is a possibility that part of the edge passes through the clipping region. Corner vertex detection is turned on whenever there is a possibility that the edge of the polygon intersects one of the boundaries E1–E4 in FIG. 9.

The basic concepts remain the same in three dimensions (3D). The main differences are that in 3D the 3D space gets partitioned into 27 spaces instead of 9, the code words are 6 bits wide instead of 4, and in addition to corner vertices, vertices at the intersection of the plane of the polygon and the intersection line of two of the boundary planes of the clip region may need to be added.

As would be apparent to one of ordinary skill in the art, the present invention could easily be applied to multiprocessor systems including parallel processing systems, pipelined processing systems, and combinations of the above. For example, separate processors could handle separate portions of the flowchart described in FIGS. 12A–E.

The present invention may also be applied to polygons that are tesselated or otherwise have multiple connections between multiple vertices. However, rather than handling each edge by walking around the vertices as described above with reference to FIGS. 12A–E.D, other approaches could be utilized. For example, each edge could be individually reviewed to determine clipping and functional evaluations for that edge. In addition, each vertex could be reviewed to determine whether it or a vertex connected to that vertex is within the clipping volume, and then evaluate the remaining edges that cross the clip region. These approaches are also easily handled by multiprocessor systems.

One advantage of the present invention is its complexity depends more directly on the actual flux (number of edges crossing the boundary of the canonical clip-region) than current techniques. As a result, unnecessary intersection computations were avoided.

Although the present invention has been fully described above with reference to specific embodiments, other alternative embodiments will be apparent to those of ordinary skill in the art. For example, corner vertices could be generated and evaluated only when a vertex enters the clip region. Therefore, the above description should not be taken as limiting the scope of the present invention which is defined by the appended claims.

What is claimed is:

1. A method of clipping a graphical polygon to a clip region, said polygon being defined by a plurality of vertices with connecting edges, comprising the steps of:

computing which vertices of a polygon to be displayed are discarded, the discarded vertices being not connected to an edge that intersects the clip region, and computing at least one color factor only for vertices not discarded;

computing boundary vertices on any edges that intersect a clip region boundary and computing at least one color factor therefor by interpolating color factors previously computed for vertices connected to said edges;

computing at least one color factor for each edge point within said clip region by interpolating color factors previously computed for vertices connected to said edge; and displaying said vertices according to said computed color factors.

2. The method of claim 1 wherein the step of computing a color factor for vertices not discarded includes computing a lighting function for vertices not discarded.

3. The method of claim 1 wherein the step of computing a color factor for vertices not discarded includes computing a modeling function for vertices not discarded.

4. An apparatus for clipping a graphical polygon to a clip region, said polygon being defined by a plurality of vertices with connecting edges, comprising:

means for computing which vertices of a polygon to be displayed are discarded, the discarded vertices being not connected to an edge that intersects the clip region, and for computing at least one color factor only for vertices not discarded;

means for computing boundary vertices on any edges that intersect a clip region boundary and for computing at least one color factor therefor by interpolating color factors previously computed for vertices connected to said edges;

means for computing at least one color factor for each edge point within said clip region by interpolating color factors previously computed for vertices connected to said edge; and means for displaying said vertices according to said computed color factors.

5. The apparatus of claim 4 wherein the means for computing a color factor for vertices not discarded includes computing a lighting function for vertices not discarded.

6. The apparatus of claim 4 wherein the means for computing a color factor for vertices not discarded includes computing a modeling function for vertices not discarded.

7. A data processing system for clipping a graphical polygon to a clip region, said polygon being defined by a plurality of vertices with connecting edges, comprising:

processing means for processing data;

storage means for storing data to be processed; and graphics processing means coupled to said processing means for processing graphical data, said graphics processing means including:

i) means for computing which vertices of a polygon to be displayed are discarded, the discarded vertices being not connected to an edge that intersects the clip region, and for computing at least one color factor only for vertices not discarded;

ii) means for computing boundary vertices on any edges that intersect a clip region boundary and for computing at least one color factor therefor by interpolating color factors previously computed for vertices connected to said edges;

iii) means for computing at least one color factor for each edge point within said clip region by interpolating color factors previously computed for vertices connected to said edge; and iv) means for displaying said vertices according to said computed color factors.

8. The data processing system of claim 7 wherein the means for computing a color factor for vertices not discarded includes computing a lighting function for vertices not discarded.

9. The data processing system of claim 7 wherein the means for computing a color factor for vertices not discarded includes computing a modeling function for vertices not discarded.

10. A computer program product comprising:

a computer usable medium having computer readable program code means embodied in said medium for clipping a graphical polygon to a clip region, said polygon being defined by a plurality of vertices with connecting edges, said computer program product having:

computer readable program code means for causing a computer to effect computing which vertices of a polygon to be displayed are discarded, the discarded vertices being not connected to an edge that intersects the clip region, and for computing at least one color factor only for vertices not discarded;

computer readable program code means for causing a computer to effect computing boundary vertices on any edges that intersect a clip region boundary and for computing at least one color factor therefor by interpolating color factors previously computed for vertices connected to said edges;

computer readable program code means for causing a computer to effect computing at least one color factor for each edge point within said clip region by interpolating color factors previously computed for vertices connected to said edge; and computer readable program code means for causing a computer to effect displaying said vertices according to said computed color factors.

11. The computer program product of claim 10 wherein the computer readable program code means for causing a computer to effect computing a color factor for vertices not discarded includes computing a lighting function for vertices not discarded.

12. The computer program product of claim 10 wherein the computer readable program code means for causing a computer to effect computing a color factor for vertices not discarded includes computing a modeling function for vertices not discarded.

* * * * *